United States Patent
Nandy et al.

(10) Patent No.: US 12,542,734 B2
(45) Date of Patent: Feb. 3, 2026

(54) EFFICIENT MULTICAST FORWARDING BY SHARED GATEWAY SWITCH IN MULTI-FABRIC NETWORK

(71) Applicant: Hewlett Packard Enterprise Development LP, Spring, TX (US)

(72) Inventors: Tathagata Nandy, Bangalore (IN); Thomas Samuel, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 353 days.

(21) Appl. No.: 18/141,035

(22) Filed: Apr. 28, 2023

(65) Prior Publication Data

US 2024/0364618 A1    Oct. 31, 2024

(51) Int. Cl.
*H04L 45/16* (2022.01)
*H04L 45/64* (2022.01)
*H04L 45/74* (2022.01)

(52) U.S. Cl.
CPC .............. *H04L 45/16* (2013.01); *H04L 45/64* (2013.01); *H04L 45/74* (2013.01)

(58) Field of Classification Search
CPC ......... H04L 45/16; H04L 45/64; H04L 45/74; H04L 45/7453; H04L 12/4633; H04L 45/04; H04L 41/122
See application file for complete search history.

(56) References Cited

U.S. PATENT DOCUMENTS

| | | | |
|---|---|---|---|
| 2008/0313450 A1* | 12/2008 | Rosenberg | H04L 67/104 713/2 |
| 2017/0093718 A1* | 3/2017 | Lin | H04L 47/34 |
| 2017/0163569 A1* | 6/2017 | Koganti | H04L 45/66 |
| 2019/0268256 A1* | 8/2019 | Mirsky | H04L 67/146 |
| 2021/0099379 A1* | 4/2021 | Kaliyamoorthy | H04L 45/02 |
| 2023/0022760 A1* | 1/2023 | Nandy | H04L 12/4633 |

* cited by examiner

*Primary Examiner* — Mohamed A Kamara
(74) *Attorney, Agent, or Firm* — Yao Legal Services, Inc.

(57) ABSTRACT

A system for efficient multicast forwarding at a switch is provided. During operation, the switch can maintain a first tunnel with a first switch in a first overlay tunnel fabric, and a second tunnel with a second switch in a second overlay tunnel fabric. The switch can operate as the gateway for both fabrics. The system can obtain a first fabric identifier and a second fabric identifier from multicast control packets received via the first and second tunnels, respectively. A fabric identifier can uniquely identify a fabric. The system can then store, in a data structure, a first network address of the first switch and a second network address of the second switch in association with the first and second fabric identifiers, respectively. The system can determine whether to forward multicast traffic to either one of the first and second fabrics based on the first and second fabric identifiers, respectively.

20 Claims, 10 Drawing Sheets

EFFICIENT MULTICAST FORWARDING BY SHARED GATEWAY SWITCH IN MULTI-FABRIC NETWORK

BACKGROUND

Field

The present disclosure relates to communication networks. More specifically, the present disclosure relates to a method and system for efficiently forwarding multicast traffic from a gateway switch shared by multiple distributed tunnel fabrics.

BRIEF DESCRIPTION OF THE FIGURES

In the figures, like reference numerals refer to the same figure elements.

DETAILED DESCRIPTION

In various Internet applications, multicast is frequently used to distribute content such as video from a source to multiple hosts. Efficient distribution of multicast traffic can improve the performance of a network. A network-layer multicast protocol, such as protocol-independent multicast (PIM) can be used for distributing content in a heterogeneous network. In some scenarios, a host can send a client join request (e.g., an Internet Group Management Protocol (IGMP) join request, or a Multicast Listener Discovery (MLD) join request) to an upstream switch. The switch may support different protocols and services. For example, the switch can support an overlay network formed based on tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs).

To deploy a VPN over the tunnels, a respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric. Since the fabric is an overlay network, a respective switch in the fabric can be a tunnel endpoint of one or more tunnels. Furthermore, a gateway switch of the fabric can be a virtual gateway switch (VGS) shared among a plurality of participating switches.

The aspects described herein solve the problem of efficiently filtering multicast traffic at a multi-fabric shared gateway switch in an overlay network by (i) generating an MFID at a respective switch identifying the local fabric and providing it to the gateway switch; (ii) determining which switch belongs to which fabric based on respective MFIDs; and (iii) the gateway switch filtering the multicast traffic forwarding based on the determination. Here, the same gateway switch can be shared among multiple fabrics. Because the switches of the same fabric can generate the same MFID, the gateway switch can determine which switch belongs to which of the fabrics sharing the gateway switch. The gateway switch can then filter multicast traffic accordingly.

A distributed tunnel fabric in an overlay network can be coupled to other networks via the gateway switch, which can include a VGS, of the fabric. Typically, at least two switches can operate as a single switch in conjunction with each other to facilitate the VGS. Switches participating in the VGS can be referred to as participating switches. A respective participating switch can consider the other participating switches as peer participating switches (or peer switches). A respective pair of participating switches can be coupled to each other via an inter-switch link (ISL). The VGS can be associated with one or more virtual addresses (e.g., a virtual Internet Protocol (IP) address and/or a virtual media access control (MAC) address). A respective tunnel formed at the VGS can use the virtual address to form the tunnel endpoint. As a result, other tunnel endpoints (i.e., other switches) of the fabric can consider the VGS as the other tunnel endpoint for a tunnel instead of any of the participating switches. Even though a switch in a distributed tunnel fabric may not be a To forward traffic toward the VGS, a respective switch in the fabric can perform a load balancing operation (e.g., based on hashing on a respective packet) and select one of the participating switches as the destination (i.e., as the other tunnel endpoint). The switch can then forward the packet via a tunnel between the tunnel endpoints. Hence, an endpoint may forward a multicast control packet to one of the participating switches, which in turn, can share the control packet with a peer participating switch via the ISL. If the fabric is a multi-fabric network, the fabric can be one of a plurality of fabrics forming the network. A respective fabric can then include a gateway switch, which can include a VGS, that can be coupled to a remote gateway switch of another fabric, an external network, or both.

For example, the gateway switch can be coupled to the remote gateway switch via an inter-fabric tunnel (i.e., a tunnel coupling two fabrics). A packet received at the gateway switch via an intra-fabric tunnel (i.e., a tunnel within a fabric) can be encapsulated with a tunnel header associated with the intra-fabric tunnel. The gateway switch can decapsulate the tunnel header and re-encapsulate the packet with another tunnel header associated with the inter-fabric tunnel. A respective switch operating as a tunnel endpoint in the fabric can use a routing protocol, such as Border Gateway Protocol (BGP). In a multi-fabric overlay network, routes for intra-fabric tunnels can be determined by using internal BGP (iBGP) while the routes for inter-fabric tunnels can be determined by using external BGP (eBGP).

Since the gateway switch may support external communication for the fabric, the gateway switch often can be a high-capacity switch. Furthermore, if the gateway switch is a VGS, deployment of the gateway switch includes deploying at least two switches operating in conjunction with each other. As a result, the gateway switch can be expensive and complex. To mitigate the cost and complexity of deploying the gateway switch, it can be shared among a plurality of fabrics (e.g., a set of sharing fabrics). The same gateway switch can support external communication for the sharing fabrics. A multicast source can be coupled to one of the sharing fabrics (e.g., a source fabric) while a requesting host can be coupled to another one (e.g., a requesting fabric). If the host sends a join request, the switch coupling the host (e.g., a requesting switch) in the requesting fabric can receive the join request and forward it to the gateway switch.

With existing technologies, the gateway switch may forward the join request back to the requesting fabric while forwarding the request to the switch coupling the source (e.g., a source switch) via the source fabric. Consequently, the multicast traffic distribution may not converge in the requesting fabric. On the other hand, the host and the source can be coupled to the same fabric in the sharing fabrics. If the gateway switch is configured as the Rendezvous Point (RP) for a multicast group, the join request from the host and the multicast data flow (or multicast flow) from the source can both be forwarded to the gateway switch. Accordingly, the gateway switch can add the requesting switch to the outgoing interface list (OList) of the multicast group. Hence, the gateway switch may forward the multicast flow to the requesting switch. However, the multicast flow can also be directly forwarded to the requesting switch from the source switch via a corresponding tunnel in the fabric. As a result, the requesting switch may receive multiple multicast flows.

In addition, the sharing fabrics can use the multicast Bootstrap Router (BSR) protocol to elect the RP. Bootstrap messages (BSMs) associated with the BSR protocol can allow the switches to elect the RP in a distributed way. Since the gateway switch is shared among the sharing fabrics, the gateway switch may receive the BSMs from each of the sharing fabrics. However, if the gateway switch forwards a BSM from a fabric back to the same fabric, the BSM can cause a loop in the fabric. For each of these scenarios, the gateway switch may not distinguish which tunnel endpoint belongs to which of the sharing fabrics. Hence, the gateway switch may not prevent the forwarding of some multicast packets, such as a join request, a multicast data packet, and a BSM, back to the fabric that sent the packets. Consequently, the multicast forwarding from the gateway switch can be inefficient and may interrupt the convergence of the network.

To solve this problem, a respective switch in a sharing fabric can determine other switches in the fabric and determine the respective network addresses of the switches. A network address can include one or more of: an Internet Protocol (IP) address and a media access control (MAC) address. For example, the determined set of network addresses can represent the IP addresses of all switches in the fabric. The switch may also determine an AS number associated with the sharing fabric. The switch can then generate a hash value by applying a hash function on the IP addresses and the AS number. Because each switch of the fabric can determine the same set of IP addresses associated with that specific fabric, the switches in the fabric can generate the same unique hash value, which can then be used as the MFID of the fabric. The switches can use symmetric hashing to ensure that the order of the IP addresses does not have an impact on how the MFID is generated.

Upon generating the MFID, the switch can include the MFID and the AS number in a discovery message. The discovery message can be a Protocol Independent Multicast (PIM) Hello message. The MFID and the AS number can then be included in an optional field of the Hello message. The switch can then send the discovery message to the gateway switch. In this way, the gateway switch can receive a message that identifies the fabric of a respective switch of a respective sharing fabric. The gateway switch can then maintain a discovery data structure that maps the MFID of a sharing fabric to the set of IP addresses of the switches in the fabric. Since the gateway switch can identify which switch belongs to which sharing fabric, the gateway switch can avoid sending join requests, multicast flow, and BSMs back to the fabric that sent them.

In particular, when the gateway switch receives a join request (e.g., a PIM join request) for a multicast group via a requesting fabric, the gateway switch can determine where the source switch is and forward the join request via the source fabric. Here, the gateway switch can refrain from forwarding the join request back to the requesting fabric based on the MFID of the requesting fabric. Furthermore, while operating as an RP of a multicast group, the gateway switch can receive a multicast data packet via the source fabric. The gateway switch can then determine whether any switch in the OList of the multicast group is in the source fabric based on the MFID of the source fabric and refrain from forwarding the data packet to such a switch. Alternatively, the switch can refrain from adding such a switch to the OList. Moreover, upon receiving a BSM via a fabric, the gateway switch can refrain from forwarding the BSM back to the fabric based on the MFID of the fabric. In this way, the gateway switch can ensure efficient multicast forwarding in a multi-fabric network.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1A:
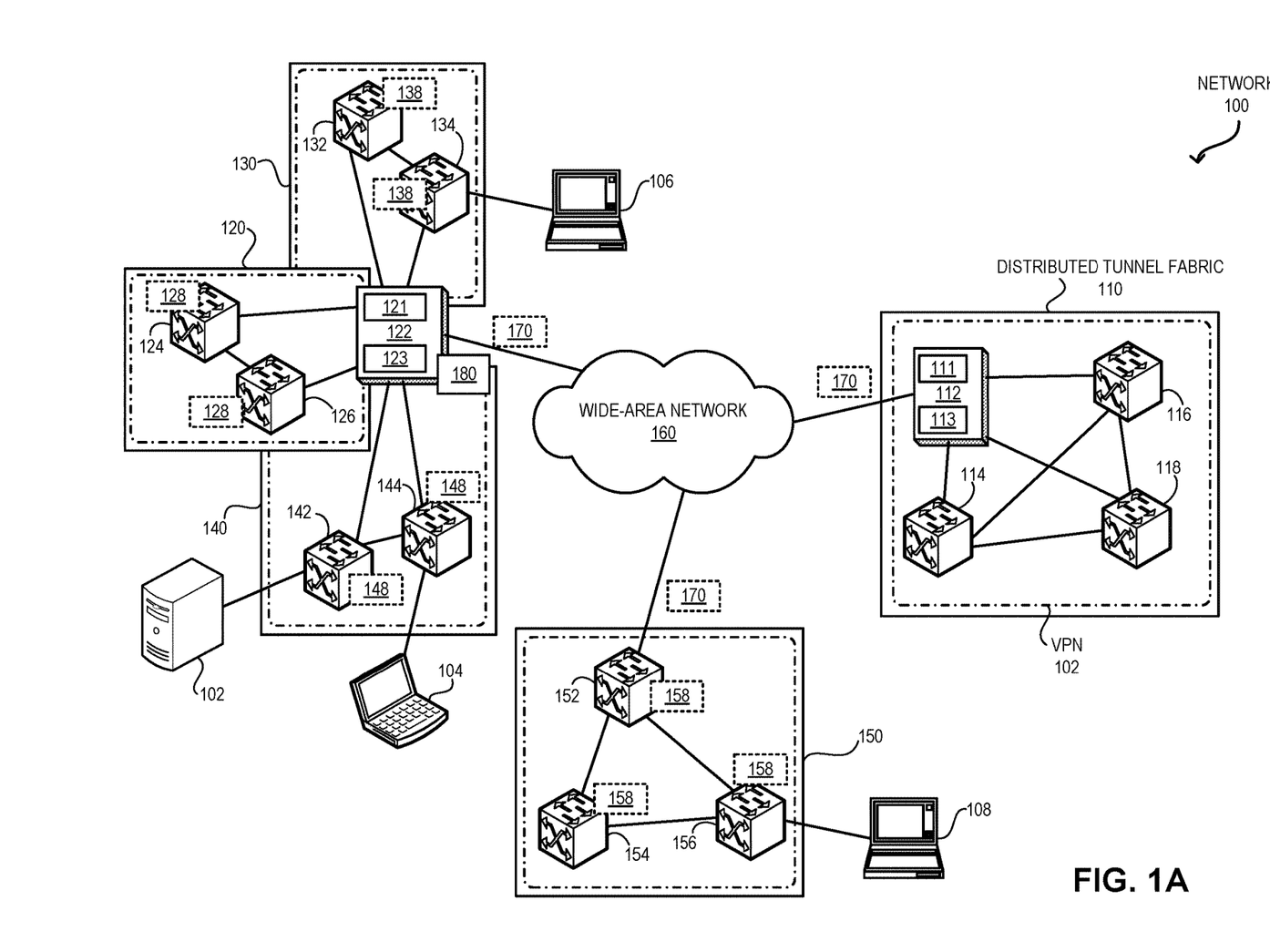
FIG. 1A illustrates an example of a gateway switch dynamically identifying each of the multiple distributed tunnel fabrics sharing the gateway switch, in accordance with an aspect of the present application.

FIG. 1A illustrates an example of a gateway switch dynamically identifying each of the multiple distributed tunnel fabrics sharing the gateway switch, in accordance with an aspect of the present application. An overlay network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a plurality of distributed tunnel fabrics 110, 120, 130, 140, and 150. Hence, network 100 can be a multi-fabric network. Fabric 110 can include switches 111, 113, 114, 116, and 118; fabric 120 can include switches 124 and 128; fabric 130 can include switches 132 and 134; fabric 140 can include switches 142 and 144; and fabric 150 can include switches 152, 154, and 156. A respective switch in a respective fabric can be associated with a MAC address and an IP address. In a respective fabric of network 100, switches can be coupled to each other via a tunnel.

In FIG. 1, a respective link denoted with a solid line between a switch pair can indicate a tunnel. Switches of a respective fabric in network 100 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). The underlying network can be a physical network, and a respective link of the underlying network can be a physical link. A respective switch pair in the underlying network can be a Border Gateway Protocol (BGP) peer. A VPN 102, such as an Ethernet VPN (EVPN), can be deployed over fabric 110. Similarly, respective instances of a VPN can be deployed over the other fabrics of network 100.

A VGS 112 can operate as the gateway switch of fabric 110 and facilitate external communication of fabric 110. For example, VGS 112 can couple fabric 110 to a wide-area network (WAN) 160, such as an enterprise network or the Internet. In fabric 110, switches 111 and 113 can operate as a single switch in conjunction with each other to facilitate VGS 112. VGS 112 can be associated with one or more virtual addresses (e.g., a virtual IP address and/or a virtual MAC address). A respective tunnel formed at VGS 112 can use the virtual address to form the tunnel endpoint. To efficiently manage data forwarding, switches 111 and 113 can maintain an ISL between them for sharing control and/or data packets. The ISL can be a layer-2 or layer-3 connection that allows data forwarding between switches 111 and 113. The ISL can also be based on a tunnel between switches 111 and 113 (e.g., a VXLAN tunnel).

Because the virtual address of VGS 102 is associated with both switches 113 and 113, other tunnel endpoints, such as switches 114, 116, and 118, of fabric 110 can consider VGS 112 as the other tunnel endpoint for a tunnel instead of switches 111 and 113. To forward traffic toward VGS 112 in fabric 110, a remote switch, such as switch 114, 116, or 118, can operate as a tunnel endpoint while VGS 112 can be the other tunnel endpoint. From a respective remote switch of fabric 110, there can be a set of paths (e.g., equal-cost multiple paths or ECMP) to VGS 112. For example, the ECMP can include a path to switch 111 and another path to switch 113. Hence, a respective path in the underlying network can lead to one of the participating switches of VGS 112.

Because of the supported features and enhanced physical deployment (e.g., using multiple switches operating as a VGS), a gateway switch can be expensive and complex. To mitigate the cost and complexity of deploying a gateway switch, a gateway switch 122 can be shared among fabrics 120, 130, and 140. Hence, fabrics 120, 130, and 140 can be referred to as sharing fabrics. If switch 122 is a VGS, switches 121 and 123 can operate as a single switch in conjunction with each other to facilitate VGS 122. Here, switches 121 and 123 can be in each of fabrics 120, 130, and 140. Other switches in fabrics 120, 130, and 140 can consider VGS 122 as the other tunnel endpoint for a tunnel instead of switches 121 and 123. From a respective remote switch of fabrics 120, 130, and 140, there can be a set of ECMP to VGS 122.

Switch 122 can support external communication for fabrics 120, 130, and 140. In network 100, switch 122 can be coupled to switches 112 and 152 via an inter-fabric tunnel (i.e., a tunnel coupling fabrics 110 and 150). A packet between fabrics 120 and 150 can be received at switch 122 via an intra-fabric tunnel within fabric 120 and can be encapsulated with a tunnel header associated with the intra-fabric tunnel. Switch 122 can decapsulate the tunnel header and re-encapsulate the packet with another tunnel header associated with the inter-fabric tunnel. To facilitate the forwarding of the packet, switch 122 can determine routes for intra-fabric tunnels using iBGP and routes for inter-fabric tunnels using eBGP.

One or more switches of a respective fabric in network 100 can be coupled to one or more end devices. In this example, end devices 102, 104, 106, and 108 can be coupled to switches 142, 144, 134, and 156, respectively. Suppose that end device 102 is the source for a multicast group. On the other hand, end devices 104, 106, and 108 can be hosts requesting traffic belonging to the multicast group. Hence, end devices 102, 104, 106, and 108 can also be referred to as source 102, and hosts 104, 106, and 108, respectively. To receive multicast data from source 102, hosts 104, 106, and 108 can send respective multicast join requests. Switches 144, 134, and 156 can receive the join requests from locally coupled hosts. Hence, switches 144, 134, and 156 can be referred to as requesting switches.

In network 100, source 102 can be coupled to fabric 140 while host 106 can be coupled to another one fabric 130. If host 106 sends a join request, switch 134 in fabric 130 can receive the join request and forward it to switch 122. With existing technologies, switch 122 may forward the join request back to fabric 130 while forwarding the join request to switch 142 coupling source 102 via fabric 140. Because the join request can return to switch 134, the multicast traffic distribution may not converge in fabric 130. Another host 104 can be coupled to the same fabric 140 coupling source 102. If switch 122 is configured as the RP for a multicast group, the join request from host 104 can be received by switch 144, which can forward it to switch 122. Accordingly, switch 122 can add switch 144 to the OList of the multicast group. Similarly, the multicast flow from source 102 can be received by switch 142, which can forward the multicast flow to switch 122. Hence, switch 122 may forward the multicast flow to switch 144. However, the multicast flow can also be directly forwarded to switch 144 from switch 142 via a corresponding tunnel in fabric 140. As a result, switch 144 may receive multiple multicast flows.

In addition, fabrics 120, 130, and 140 can use the multicast BSR protocol to elect the RP. BSMs associated with BSR can allow the switches in these fabrics to elect the RP in a distributed way. Since switch 122 is shared among fabrics 120, 130, and 140, switch 122 may receive the BSMs from each of these fabrics. However, if switch 122 forwards a BSM from fabric 120 back to fabric 120, the BSM can cause a loop in fabric 120. In the same way, BSMs can also cause respective loops in fabrics 130 and 140. For each of these scenarios, switch 120 may not distinguish which switch belongs to which of fabrics 120, 130, and 140. Hence, switch 122 may not prevent the forwarding of some multicast packets, such as a join request, a multicast data packet, and a BSM, back to the fabric that the packets are received from (e.g., back to the same fabric of fabrics 120, 130, and 140). Consequently, the multicast forwarding from switch 122 can be inefficient and may interrupt the convergence of network 100.

To solve this problem, a respective switch in fabric 120 can determine other switches in fabric 120 and determine the respective IP addresses of the other switches. For example, switches 124 and 126 can identify each other as a remote endpoint of a tunnel coupling them and determine the IP address of the remote switch. Similarly, switches 124 and 126 can also determine the network address of switch 122. The network address can include one or more of: the IP address of switch 122 and the MAC address of switch 122. For example, the determined set of network addresses can represent the IP addresses of all switches in fabric 120. Accordingly, switches 124 and 126 can determine the same set of IP addresses, which include the respective IP addresses of switches 122, 124, and 126, associated with fabric 120. Switches 124 and 126 may also determine an AS number associated with fabric 120.

Each of switches 124 and 126 can then generate a hash value 128 by applying a hash function on the IP addresses and the AS number. Because the hash function is applied to the same set of IP addresses, switches 124 and 126 can generate the same unique hash value 128, which can then be used as the MFID of fabric 120. Hence, hash value 128 can also be referred to as MFID 128. Switches 124 and 126 can use symmetric hashing to ensure that the order of the set of IP addresses does not have an impact on how MFID 128 is generated. In the same way, switches 132 and 134 can generate the same unique MFID 138 of fabric 130, and switches 142 and 144 can generate the same unique MFID 148 of fabric 140. Switches in a fabric that does not share a gateway switch may also generate an MFID. For example, even though gateway switch 152 of fabric 150 is not shared with another fabric, switches 154 and 156 may generate an MFID 158 of fabric 150.

Upon generating MFID 128, switch 124 can include MFID 128 and the AS number in a discovery message. The discovery message can be a PIM Hello message. MFID 128 and the AS number can then be included in an optional field of the Hello message. Switch 124 can then send the discovery message with MFID 128 to switch 122. In the same way, switch 126 can then send a discovery message with MFID 128 to switch 122. Because both switches 124 and 126 report the same MFID 128, switch 122 can determine that switches 124 and 126 are in the same fabric 120. In fabric 130, switches 132 and 134 can send respective discovery messages with MFID 138 to switch 122. Furthermore, in fabric 140, switches 142 and 144 can send respective discovery messages with MFID 148 to switch 122. Switch 122 can determine that switches 132 and 134 are in the same fabric 130, and switches 142 and 144 are in the same fabric 140.

In this way, switch 122 can receive respective messages that can identify which switch belongs to which of fabrics 120, 130, and 140. Switch 122 can then maintain a discovery data structure 180 that MFID 128 of fabric 120 to the set of IP addresses of the switches in fabric 120. Similarly, discovery data structure 180 can map MFID 138 to the IP addresses of the switches in fabric 130, and MFID 148 to the IP addresses of the switches in fabric 140. A respective entry of discovery data structure 180 can include the mapping between an MFID of a fabric and the set of IP addresses of the switches (i.e., tunnel endpoints) in the fabric. The entry may also include an AS number associated with the fabric. When switch 122 receives a join request, a multicast data packet, or a BSM via a tunnel, switch 122 can determine the MFID associated with the IP address of the remote endpoint of the tunnel. Based on the MFID, switch 122 can avoid sending the join request, multicast data packet, or BSM back to the fabric that sent them.

Switch 122 can also exchange MFIDs with other gateway switches in network 100. For example, switch 122 can send a discovery message comprising a default MFID 170 to switches 112 and 152 via network 160. Default MFID 170 can indicate an inter-fabric tunnel and may include a predefined value. The predefined value can be preprogrammed at a respective gateway switch of network 100. In the same way, switches 112 and 152 can also send respective discovery messages with the same MFID 170 to the other gateway switches of network 100. In this way, a respective gateway switch of network 100 can determine the respective IP addresses of other gateway switches. Upon receiving discovery messages, switch 122 can also store the respective IP addresses of switches 112 and 152 in association with MFID 170 in discovery data structure 180. A respective gateway switch can then apply traffic filtering rules to inter-fabric data forwarding based on MFID 170.

For example, switch 152 can receive discovery messages with MFID 158 via intra-fabric tunnels of fabric 150. On the other hand, switch 152 can receive discovery messages with MFID 170 via inter-fabric tunnels via network 160. As a result, switch 152 can distinguish between inter-fabric and intra-fabric tunnels based on MFIDs 170 and 158, respectively. Based on the distinction, switch 152 can apply one or more traffic filtering rules to inter-fabric data forwarding based on MFID 170. In particular, if switch 152 receives a join request from an inter-fabric tunnel (e.g., associated with MFID 170), switch 152 may forward the join request only via intra-fabric tunnels (e.g., associated with MFID 158). Similarly, if switch 152 receives a join request from an intra-fabric tunnel, switch 152 may forward the join request only via inter-fabric tunnels.

Figure 1B:
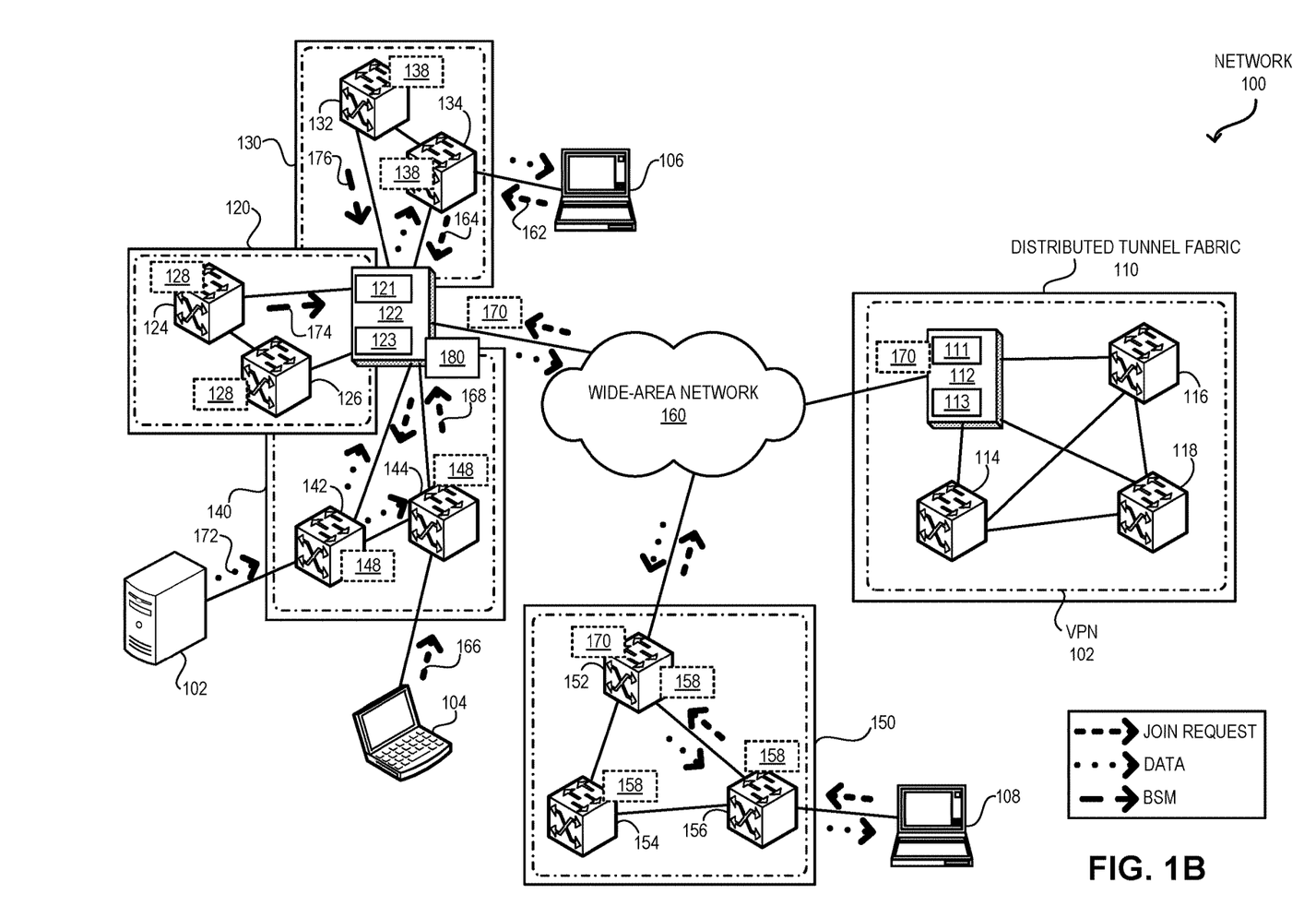
FIG. 1B illustrates an example of efficient forwarding of multicast traffic from a multi-fabric shared gateway switch, in accordance with an aspect of the present application.

FIG. 1B illustrates an example of efficient forwarding of multicast traffic from a multi-fabric shared gateway switch, in accordance with an aspect of the present application. During operation, host 106 can send a host join request 162 (e.g., an IGMP join) for a multicast group to switch 134. Switch 134 can then generate a corresponding network join request 164 (e.g., a PIM join) and send it to switch 122. Sending the join request can include encapsulating request 164 in a tunnel encapsulation header and forwarding the encapsulated request to switch 122. When switch 122 receives join request 164 via fabric 130, switch 122 can determine that source switch 142, which can couple source 102 of the multicast group, is reachable via fabric 140. Switch 122 can then forward join request 164 via fabric 140. However, because switch 122 has received join request 164 from an IP address associated with MFID 138, switch 122 can refrain from forwarding join request 164 back to any IP address associated with MFID 138 (i.e., back to fabric 130).

If switch 122 is configured as the RP for a multicast group, the join requests for the multicast group can be forwarded to switch 122. The multicast flow of the multicast group is also sent to switch 122 for facilitating the initial distribution of data. For example, host 104 can send a host join request 166 for a multicast group to switch 144. Switch 144 can then generate a corresponding network join request 168 and send it to switch 122. Upon receiving join request 168, switch 122 can add the tunnel to switch 144 to the OList. Similarly, upon receiving a join request via an inter-fabric tunnel coupling fabric 150, switch 122 can add the inter-fabric tunnel to the OList. Source 102 can send multicast flow 172 of the multicast group to switch 142. Switch 142 can encapsulate a respective data packet of multicast flow 172 and forward the encapsulated data packet to switches 122 and 144.

To avoid repeated forwarding of the data packet, switch 122 can determine whether any tunnel in the OList is in fabric 140 (i.e., associated with MFID 148). Since the IP address of switch 144 is associated with MFID 148, switch 122 can then refrain from forwarding the multicast data packet to switch 144. Alternatively, switch 122 can then refrain from adding the IP address of switch 144 to the OList. In this way, switch 144 can receive multicast flow 172 from switch 142 while switch 122 can avoid forwarding multicast flow 172 back to fabric 140. However, switch 122 can determine that the inter-fabric tunnel in the OList is not associated with MFID 148. Switch 122 can then forward encapsulated multicast flow 172 via the inter-fabric tunnel. Switch 152 can then receive multicast flow 172 and distribute it in fabric 150 (e.g., send toward requesting host 108).

If fabrics 120, 130, and 140 use the BSR protocol to elect the RP, a respective switch in these fabrics may send a BSM. The BSMs associated with the BSR protocol can allow the switches in these fabrics to elect the RP in a distributed way. Since switch 122 is shared among fabrics 120, 130, and 140, switch 122 may receive the BSMs from each of these fabrics. For example, switch 122 can receive BSMs 174 and 176 from switches 124 and 132, respectively. Upon receiving BSM 174 via fabric 120, switch 122 can determine that BSM 174 is received from an IP address associated with MFID 128. Switch 122 can then refrain BSM 174 from forwarding to any IP address associated with MFID 128 (e.g., back to fabric 120). In the same way, switch 122 can then refrain BSM 176 from forwarding to any IP address associated with MFID 138 (e.g., back to fabric 130).

Figure 2A:
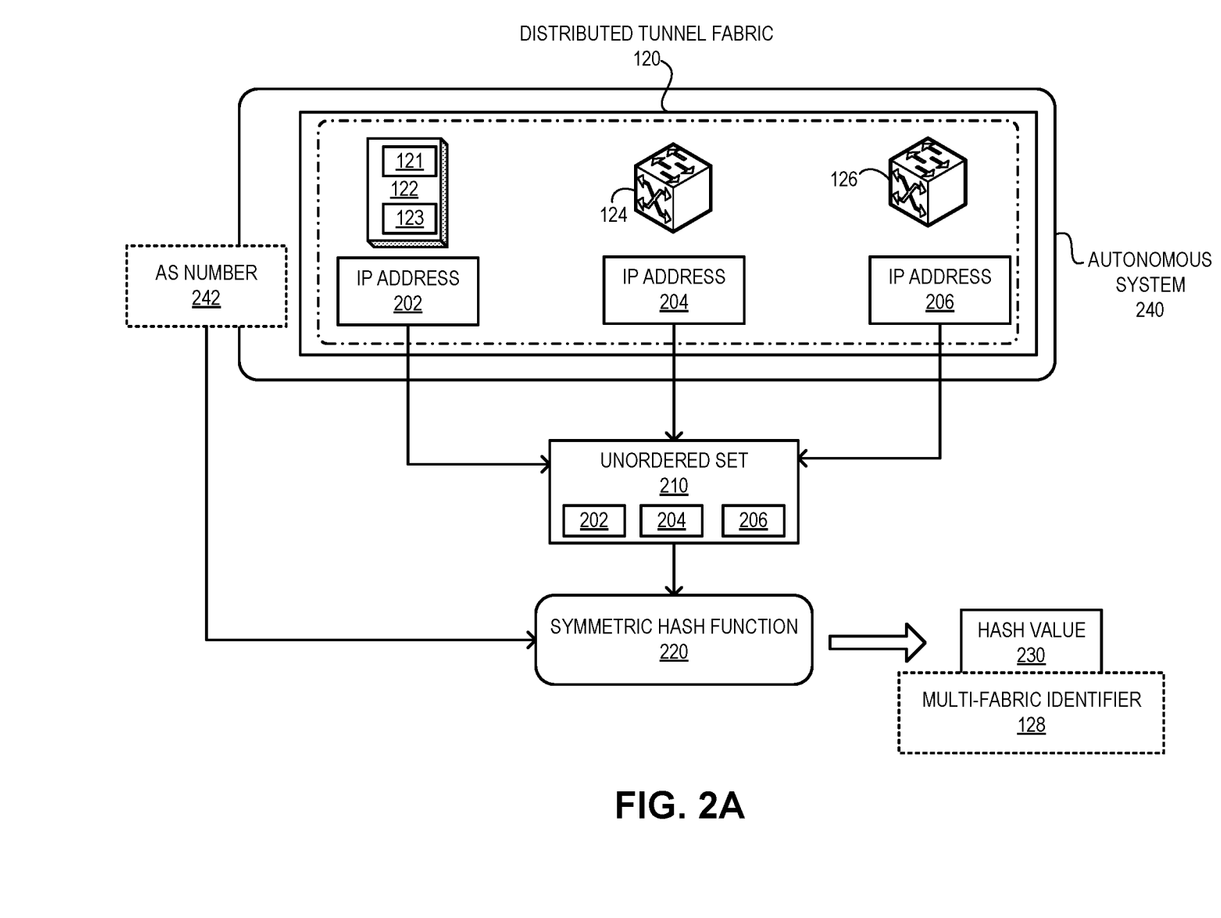
FIG. 2A illustrates an example of dynamically generating a multi-fabric identifier (MFID) for identifying a distributed tunnel fabric with a multi-fabric shared gateway switch, in accordance with an aspect of the present application.

FIG. 2A illustrates an example of dynamically generating an MFID for identifying a distributed tunnel fabric with a multi-fabric shared gateway switch, in accordance with an aspect of the present application. Switches 122, 124, and 126 can be associated with IP addresses 202, 204, and 206, respectively. Fabric 120 can be in an AS 240 associated with an AS number 242. During operation, switch 124 can determine that it has tunnels to IP addresses 202 and 206 (e.g., to switches 222 and 126, respectively). Switch 124 can then incorporate the local IP address 204 with the determined IP address to generate an unordered set of IP addresses 210. Hence, set 210 can include IP addresses 202, 204, and 206. Similarly, switch 126 can determine that it has tunnels to IP addresses 202 and 204. Switch 126 can then incorporate the local IP address 206 with the determined IP address to generate the same unordered set of IP addresses 210.

Switches 124 and 126 may also determine AS number 242 associated with fabric 120. Each of switches 124 and 126 can then generate a hash value 230 by applying a hash function 220 on the combination of set 210 and AS number 242. Here, set 210 can be an input parameter to hash function 220. On the other hand, AS number 242 can be a hash key for or an input to hash function 220. Because the hash function is applied to the same IP addresses 202, 204, and 206, and AS number 242 can be the same for fabric 120, switches 124 and 126 can generate the same unique hash value 230. Hash value 230 can then be used as MFID 128 of fabric 120. Hash function 220 can be a symmetric hash function. Therefore, the order of IP addresses 202, 204, and 206 may not have an impact on how hash value 230 is generated. For example, applying hash function 220 to IP addresses 202, 204, and 206, and IP addresses 206, 204, and 202 can produce the same hash value 230.

Figure 2B:
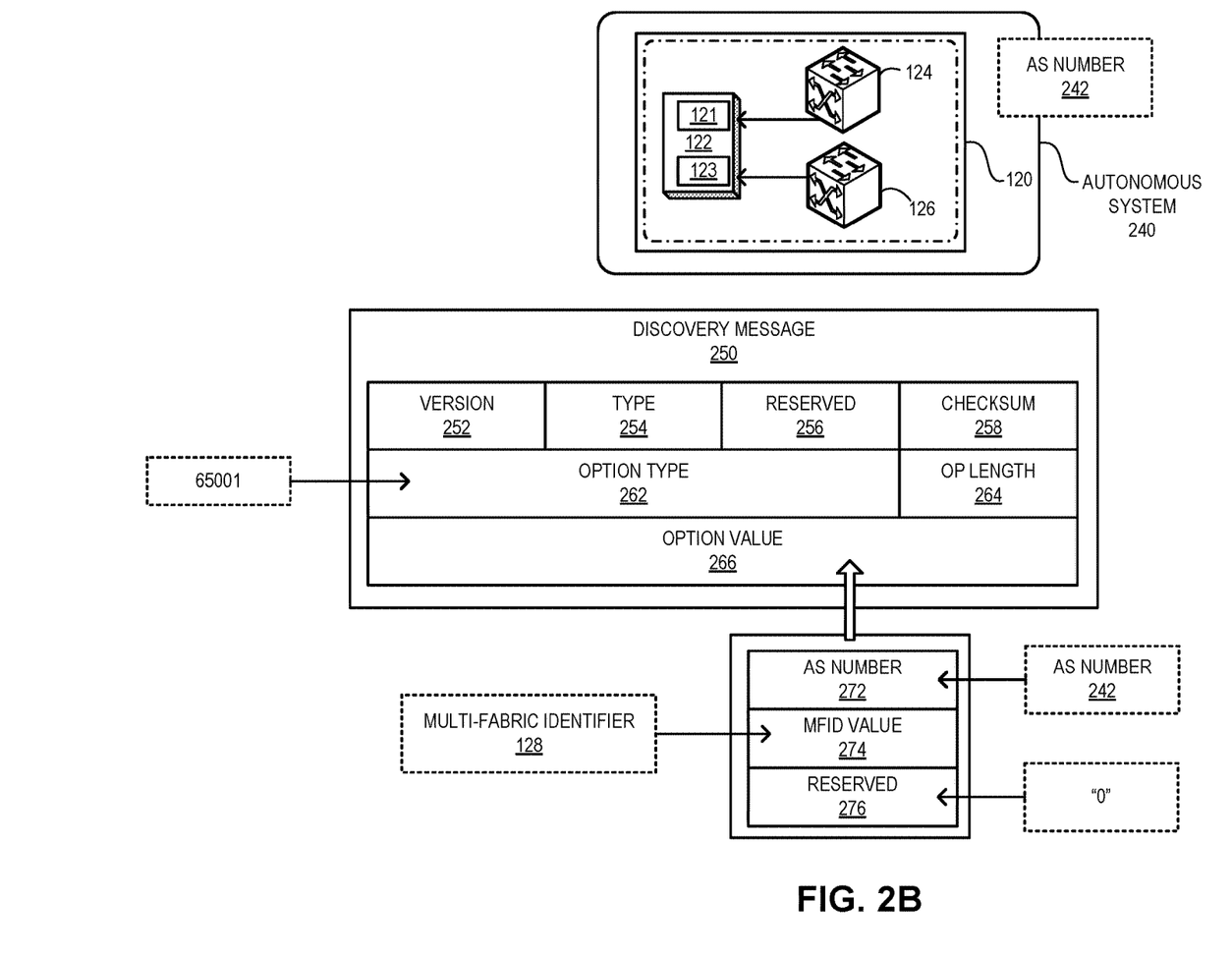
FIG. 2B illustrates an example of a discovery message with an MFID for notifying a multi-fabric shared gateway switch, in accordance with an aspect of the present application.

FIG. 2B illustrates an example of a discovery message with an MFID for notifying a multi-fabric shared gateway switch, in accordance with an aspect of the present application. A discovery message 250 can be used to share an MFID. A switch receiving message 200 can learn the MFID of the tunnel neighbor switch (i.e., a switch coupled via a tunnel). Discovery message 200 can be a multicast control message, such as a PIM hello message used for discovering PIM neighbors. Message 200 can then include a version field 252, a type field 254, a reserved field 256, a checksum field 258, an option type field 262, an option length field 264, and an option value field 266. Fields 252 and 254 can indicate the version and type of the underlying protocol, such as PIM. Option type field 262 can be used to indicate the presence of an MFID in message 250.

If discovery message 250 is a PIM Hello message, version field 252 can indicate the version of the PIM deployment, and type field 254 can indicate the type of PIM deployment. A range of values between 65001 and 65535 can be reserved by the PIM sparse mode (SM) protocol for customized use in a PIM Hello message. Option type field 262 can include a predetermined value, such as 65001, that can indicate the presence of an MFID in message 250. Option value 266 can then include one or more of: an AS number 272, an MFID value 274, and a reserved value 276. Option length 264 can indicate the length of option value 266. If message 250 is sent from switch 124 or 126, AS number 272 can include AS number 242, MFID value 274 can include MFID 128, and reserved value 276 can include a sequence of zeros.

Figure 3:
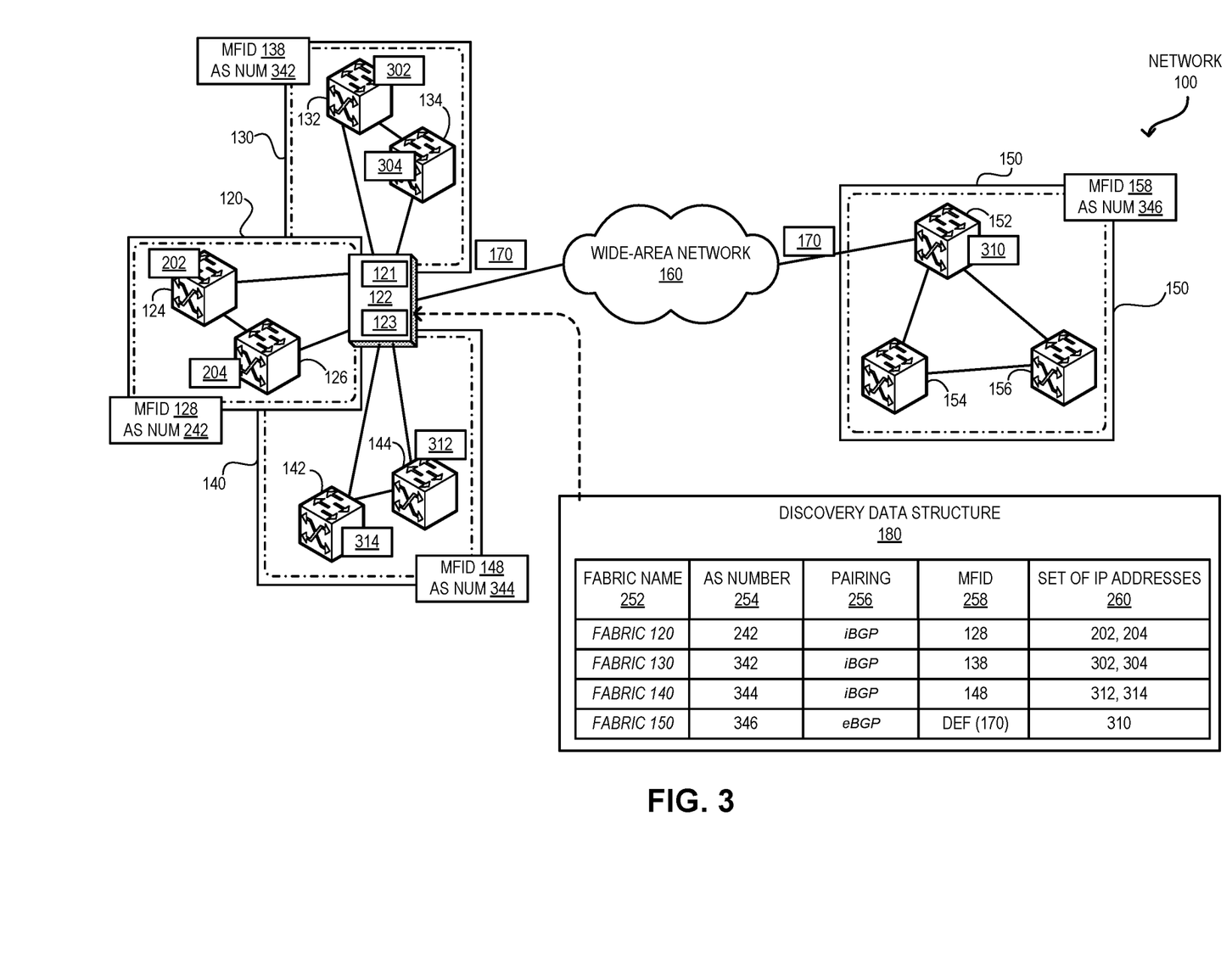
FIG. 3 illustrates an example of a discovery data structure at a multi-fabric shared gateway switch for storing MFIDs, in accordance with an aspect of the present application.

FIG. 3 illustrates an example of a discovery data structure at a multi-fabric shared gateway switch for storing MFIDs, in accordance with an aspect of the present application. On switch 122, discovery data structure 180 can map an MFID of a fabric to a set of IP addresses of the tunnel endpoints in the fabric. A respective entry of discovery data structure 180 can include a fabric name 252, an AS number 254, a pairing indicator 256, an MFID 258, and a set of IP addresses 260. Here, pairing indicator 256 can indicate the protocol used to establish the connection at switch 122. Fabric name 252 and AS number 254 can be associated with the fabric indicated by MFID 258. Furthermore, set 260 can be used to generate MFID 258. Therefore, a respective IP address in set 260 can be associated with MFID 258.

Suppose that fabrics 120, 130, 140, and 150 are associated with AS numbers 242, 342, 344, and 346 respectively. Switches 132 and 134 can be associated with IP addresses 302 and 304, respectively, based on which MFID 138 can be generated. Furthermore, switches 142 and 144 can be associated with IP addresses 312 and 314, respectively, based on which MFID 148 can be generated. A respective fabric can be associated with a preconfigured fabric name. For example, switch 122 can be configured with fabric names "fabric 120," "fabric 130," "fabric 140," and "fabric 150" associated with fabrics 120, 130, 140, and 150, respectively.

Switch 122 can generate an entry in discovery data structure 180 based on discovery messages from switches 124 and 126. The entry can include "fabric 120" as fabric name 252, AS number 242, "iBGP" as pairing indicator 256, MFID 128, and IP addresses 202 and 204. Similarly, switch 122 can generate an entry associated with fabric 130 based on discovery messages from switches 132 and 134. The entry can include "fabric 130" as fabric name 252, AS number 342, "iBGP" as pairing indicator 256, MFID 138, and IP addresses 302 and 304. In the same way, switch 122 can generate an entry associated with fabric 140 based on discovery messages from switches 142 and 144. The entry can include "fabric 140" as fabric name 252, AS number 344, "iBGP" as pairing indicator 256, MFID 148, and IP addresses 312 and 314.

Switch 122 can also generate respective entries in discovery data structure 180 based on discovery messages from gateway switches of other fabrics, such as fabric 150. For example, switch 152 can send a discovery message to switch 122 with an MFID 170, which can be based on a predefined default value. Based on the discovery message, switch 122 can generate an entry associated with fabric 150. The entry can include "fabric 150" as fabric name 252, AS number 346, "eBGP" as pairing indicator 256, MFID 170, and IP address 310 of switch 152. Based on MFID 170, switch 122 can determine that IP address 310 corresponds to an inter-fabric tunnel.

Figure 4A:
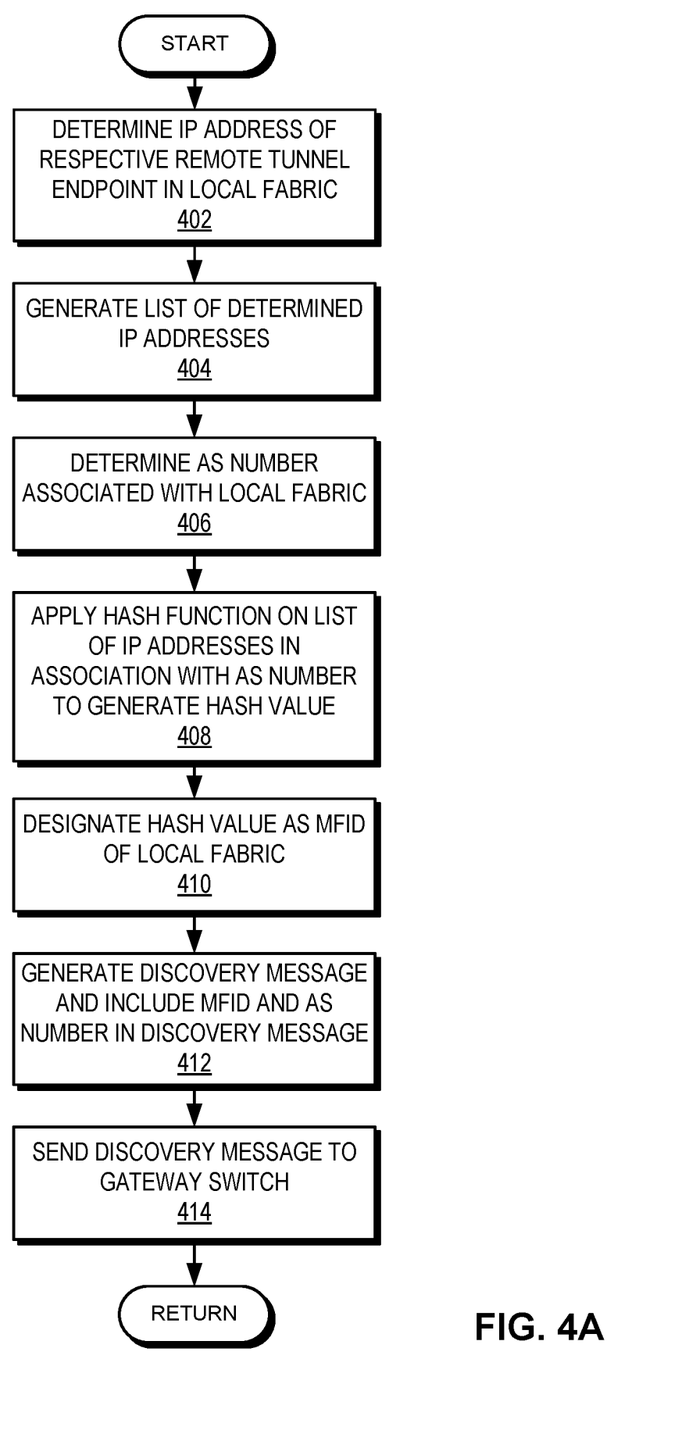
FIG. 4A presents a flowchart illustrating the process of a switch generating an MFID for the local fabric and providing it to a multi-fabric shared gateway switch, in accordance with an aspect of the present application.

FIG. 4A presents a flowchart illustrating the process of a switch generating an MFID for the local fabric and providing it to a multi-fabric shared gateway switch, in accordance with an aspect of the present application. During operation, the switch can determine the IP address of a respective remote tunnel endpoint (e.g., a remote switch) in the local fabric (operation 402) and generate a list of determined IP addresses (operation 404). The switch can also determine the AS number associated with the local fabric (operation 406). The switch can then apply a hash function on the list of IP addresses in association with the AS number to generate a hash value (operation 408).

The hash function can be a symmetric hash function. Here, the AS number can be a hash key or an input parameter to the hash function. The switch can then designate the hash value as the MFID of the local fabric (operation 410). The switch can also generate a discovery message and include the MFID and AS number in the discovery message (operation 412). The discovery message can be a PIM Hello message. The switch can then send the discovery message to the gateway switch (operation 414).

Figure 4B:
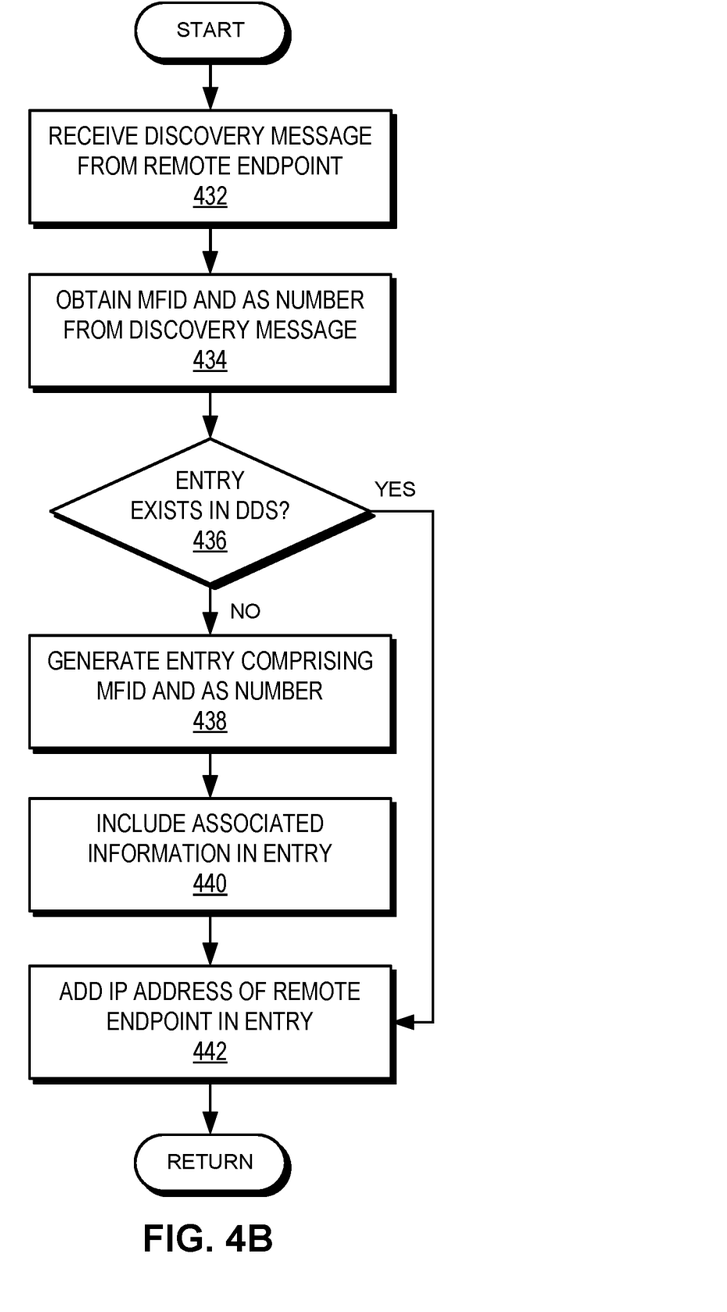
FIG. 4B presents a flowchart illustrating the process of a multi-fabric shared gateway switch storing an MFID and associated information in a discovery data structure, in accordance with an aspect of the present application.

FIG. 4B presents a flowchart illustrating the process of a multi-fabric shared gateway switch storing an MFID and associated information in a discovery data structure, in accordance with an aspect of the present application. During operation, the switch can receive a discovery message from a remote endpoint (e.g., a remote switch) (operation 432). The switch can obtain the MFID and the AS number from the discovery message (operation 434). The switch can then determine whether an entry exists in the discovery data structure (operation 436).

If the entry does not exist, the switch can generate an entry comprising the MFID and AS number (operation 438). The switch can also include associated information, such as a fabric name and a pairing indicator, in the entry (operation 440). If the entry already exists (operation 436) or upon populating the entry (operation 440), the switch can add the IP address of the remote endpoint in the entry (operation 442).

Figure 4C:
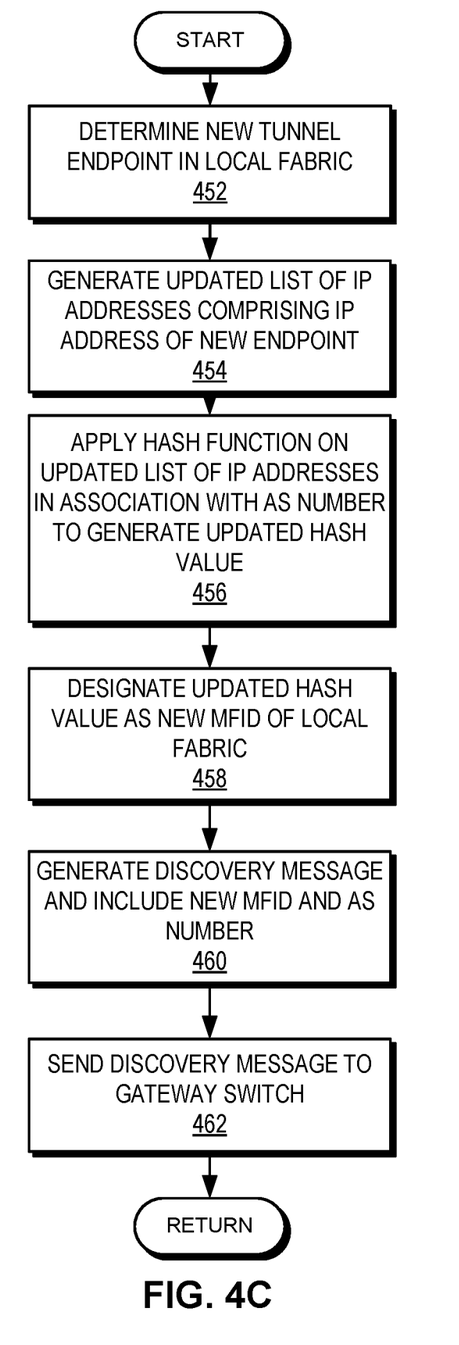
FIG. 4C presents a flowchart illustrating the process of a switch updating an MFID for the local fabric and providing it to a multi-fabric shared gateway switch, in accordance with an aspect of the present application.

FIG. 4C presents a flowchart illustrating the process of a switch updating an MFID for the local fabric and providing it to a multi-fabric shared gateway switch, in accordance with an aspect of the present application. During operation, the switch can determine a new tunnel endpoint in the local fabric (operation 452) and generate an updated list of determined IP addresses comprising the IP address of the new endpoint (operation 454).

The switch can then apply a hash function on the updated list of IP addresses in association with the AS number to generate an updated hash value (operation 456). The switch can designate the updated hash value as the new MFID of the local fabric (operation 458). The switch can also generate a discovery message and include the new MFID and AS number in the discovery message (operation 460). The switch can then send the discovery message to the gateway switch (operation 462).

Figure 5:
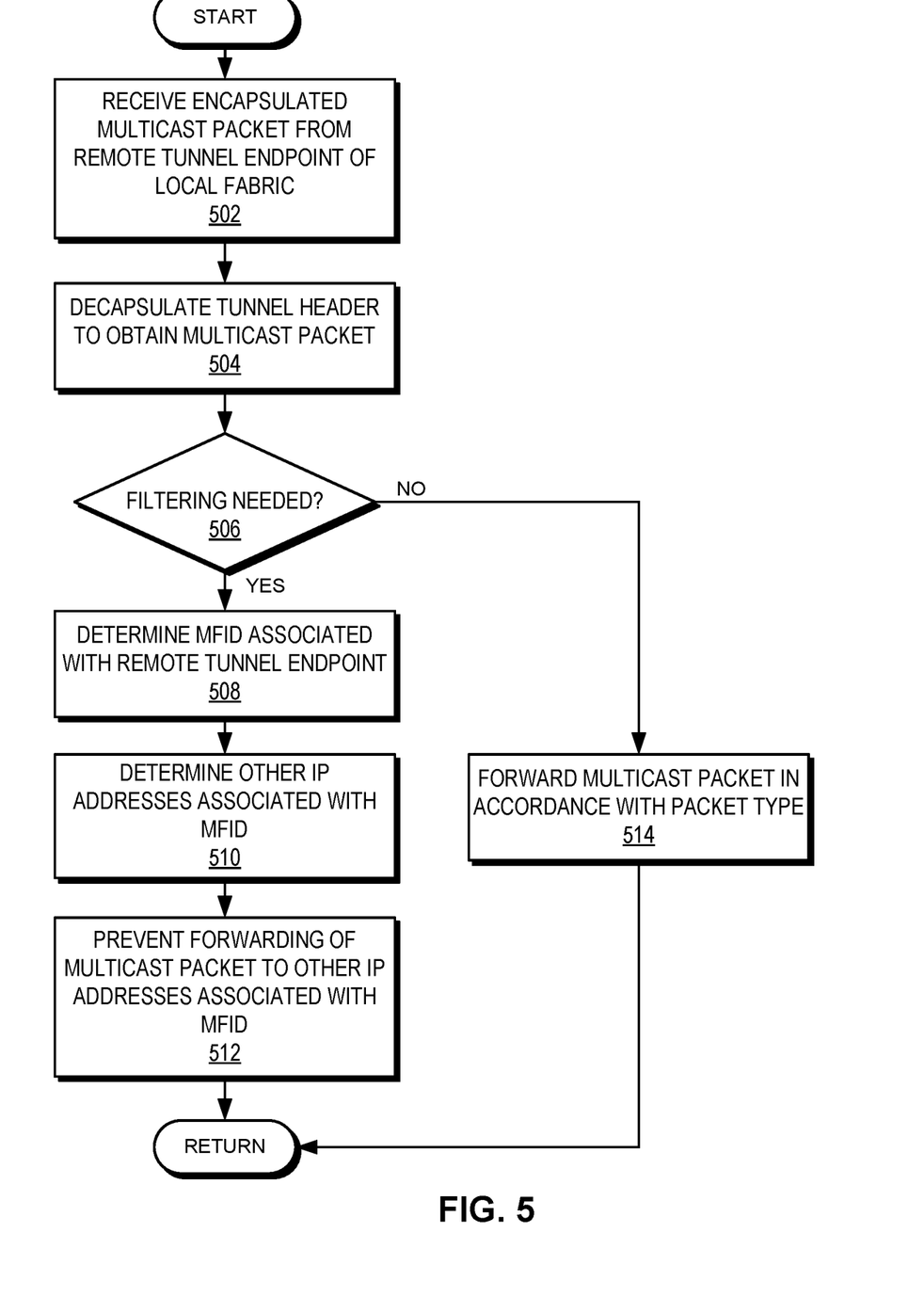
FIG. 5 presents a flowchart illustrating the process of a multi-fabric shared gateway switch forwarding a multicast packet based on MFIDs, in accordance with an aspect of the present application.

FIG. 5 presents a flowchart illustrating the process of a multi-fabric shared gateway switch forwarding a multicast packet based on MFIDs, in accordance with an aspect of the present application. During operation, the switch can receive an encapsulated multicast packet from a remote tunnel endpoint (e.g., a remote switch) of the local fabric (operation 502). The encapsulated multicast packet can be encapsulated with a tunnel header. The multicast packet can be a join request, a multicast data packet, or a BSM. The switch can decapsulate the tunnel header to obtain the multicast packet (operation 504).

The switch can then determine whether filtering is needed for the multicast packet (operation 506). For example, if the multicast packet is a BSM, the switch can determine that filtering is needed. If filtering is needed, the switch can determine the MFID associated with the remote endpoint (operation 508) and determine the other IP addresses associated with the MFID (operation 510). The switch can then prevent the forwarding of the multicast packet to other IP addresses associated with the MFID (operation 512). On the other hand, if filtering is not needed, the switch can forward the multicast packet in accordance with the packet type (operation 514).

Figure 6:
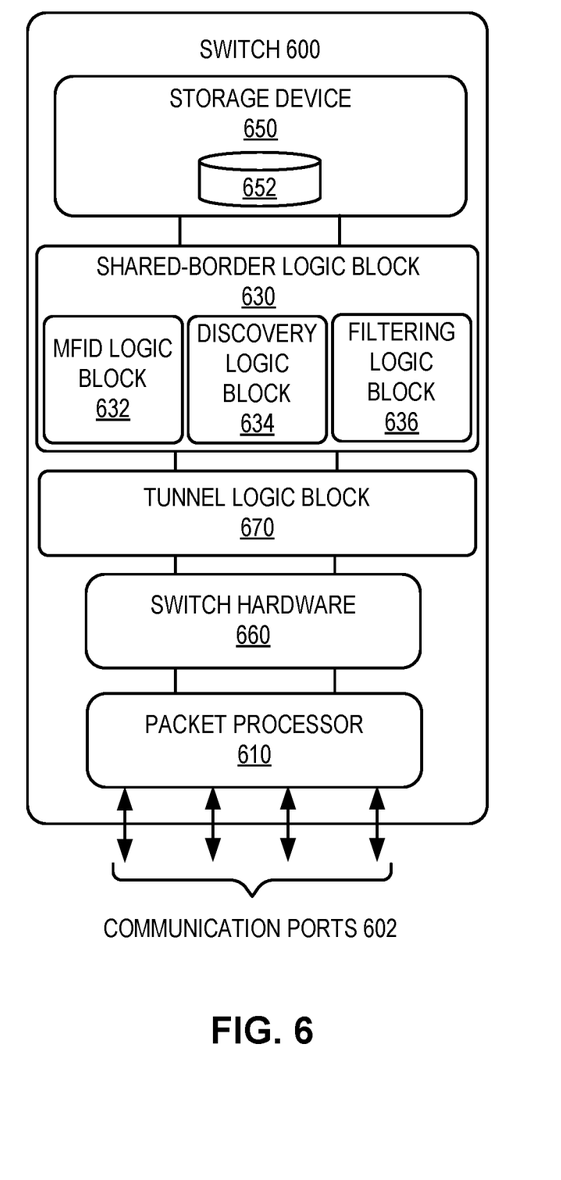
FIG. 6 illustrates an example of a switch supporting efficient forwarding of multicast traffic based on MFIDs, in accordance with an aspect of the present application.

FIG. 6 illustrates an example of a switch supporting efficient forwarding of multicast traffic based on MFIDs, in accordance with an aspect of the present application. In this example, a switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with the routing, configuration, and interfaces of switch 600. Database 652 may store the discovery data structure. Switch 600 can include a tunnel logic block 670 that can establish a tunnel with a remote switch, thereby allowing switch 600 to operate as a tunnel endpoint. Switch 600 can include a shared-border logic block 630 that can allow switch 600 to efficiently forward multicast traffic while operating as a shared gateway switch.

Shared-border logic block 630 can include an MFID logic block 632, a discovery logic block 634, and a filtering logic block 636. If switch 600 operates as a tunnel endpoint in a fabric, MFID logic block 632 can discover the IP addresses of other tunnel endpoints of the fabric and generate an MFID based on the IP addresses of the endpoints in the fabric. On the other hand, if switch 600 operates as a shared gateway switch, MFID logic block 632 can determine an MFID from a discovery message. Discovery logic block 634 can generate or populate an entry in the discovery data structure based on the information from a received discovery message. Filtering logic block 636 can filter the forwarding of a multicast packet based on the MFIDs in the discovery data structure.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a system for efficient multicast forwarding at a gateway switch of a network. During operation, the gateway switch can maintain a first tunnel with a first switch in a first overlay tunnel fabric, and a second tunnel with a second switch in a second overlay tunnel fabric. The encapsulation of a packet sent via a respective overlay tunnel fabric can be initiated and terminated within that overlay tunnel fabric. The gateway switch can operate as a gateway for the first and second overlay tunnel fabrics. The system can obtain a first fabric identifier and a second fabric identifier from multicast control packets received via the first and second tunnels, respectively. Here, a respective fabric identifier can uniquely identify an overlay tunnel fabric. The system can then store, in a data structure, a first network address of the first switch and a second network address of the second switch in association with the first and second fabric identifiers, respectively. Subsequently, the system can determine whether to forward multicast control and data traffic to either one of the first and second overlay tunnel fabrics based on the first and second fabric identifiers, respectively, in the data structure.

In a variation on this aspect, a respective fabric identifier of an overlay tunnel fabric can be a hash value of a list of network addresses of tunnel endpoints of the overlay tunnel fabric.

In a further variation, the hash value can be generated from a symmetric hash function. Here, the order of the list of network addresses does not impact the hash value.

In a further variation, the hash value can be generated further based on an autonomous system (AS) number associated with the overlay tunnel fabric.

In a variation on this aspect, the network address can include one or more of: an Internet Protocol (IP) address and a media access control (MAC) address.

In a variation on this aspect, the multicast control packets comprising the first and second fabric identifiers can be protocol-independent multicast (PIM) hello packets. A respective fabric identifier can then be included in a user-definable field of a corresponding PIM hello packet.

In a variation on this aspect, to determine whether to forward the multicast control and data traffic, the system can receive a Bootstrap message (BSM) associated with a Bootstrap Router (BSR) protocol from the first switch. The system can then determine that the first switch is in the first overlay tunnel fabric based on a mapping between the first fabric identifier and the first network address in the data structure. Subsequently, the system can prevent the forwarding of the BSM message to a respective other tunnel endpoint in the first overlay tunnel fabric based on the mapping.

In a variation on this aspect, to determine whether to forward the multicast control and data traffic, the system can receive a multicast join request for a multicast group from the first switch. The system can then determine that the first switch is in the first overlay tunnel fabric based on a mapping between the first fabric identifier and the first network address in the data structure. Subsequently, the system can prevent the forwarding of the multicast join request to a respective other tunnel endpoint in the first overlay tunnel fabric based on the mapping.

In a further variation, a source of the multicast group can be coupled to a third switch of the first overlay tunnel fabric. The system can then receive a multicast data packet of the multicast group from the third switch and prevent the forwarding of the multicast data packet to the first tunnel based on the mapping.

In a variation on this aspect, the data structure can map a respective fabric identifier of an overlay tunnel fabric to a list of network addresses of tunnel endpoints in the overlay tunnel fabric.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   maintaining, by a gateway network device, a first tunnel with a first network device in a first overlay tunnel fabric, and a second tunnel with a second network device in a second overlay tunnel fabric, wherein encapsulation of a packet sent via a respective overlay tunnel fabric is initiated and terminated within that overlay tunnel fabric, and wherein the gateway network device operates as a gateway for the first and second overlay tunnel fabrics;
   obtaining a first fabric identifier and a second fabric identifier from multicast control packets received via the first and second tunnels, respectively, wherein a respective fabric identifier uniquely identifies an overlay tunnel fabric;
   storing, in a first entry in a data structure of the gateway network device, a first Internet Protocol (IP) address of the first network device associated with the first fabric identifier;
   storing, in a second entry in the data structure, a second IP address of the second network device associated with the second fabric identifier; and
   determining whether to forward multicast control and data traffic, which is received by the gateway network device via a tunnel, to either one of the first and second overlay tunnel fabrics based on the first and second entries, respectively, in the data structure.

2. The method of claim 1, wherein a respective fabric identifier of an overlay tunnel fabric is a hash value of a list of network addresses of tunnel endpoints of the overlay tunnel fabric.

3. The method of claim 2, wherein the hash value is generated from a symmetric hash function, and wherein the list of network addresses is an unordered list.

4. The method of claim 2, wherein the hash value is further generated based on an autonomous system (AS) number associated with the overlay tunnel fabric.

5. The method of claim 1, wherein the first entry further includes a media access control (MAC) address of the first network device.

6. The method of claim 1, wherein the multicast control packets comprising the first and second fabric identifiers are protocol-independent multicast (PIM) hello packets, wherein a respective fabric identifier is included in an option field of a corresponding PIM hello packet.

7. The method of claim 1, wherein determining whether to forward the multicast control and data traffic further comprises:
   receiving a Bootstrap message (BSM) from the first network device, wherein the BSM is associated with a Bootstrap Router (BSR) protocol;
   determining that the first network device is in the first overlay tunnel fabric based on a mapping between the first fabric identifier and the first network address in the first entry in the data structure; and
   preventing forwarding of the BSM message to a respective other tunnel endpoint in the first overlay tunnel fabric based on the mapping.

8. The method of claim 1, wherein determining whether to forward the multicast control and data traffic further comprises:
   receiving a multicast join request for a multicast group from the first network device;
   determining that the first network device is in the first overlay tunnel fabric based on a mapping between the first fabric identifier and the first network address in the first entry in the data structure; and
   preventing forwarding of the multicast join request to a respective other tunnel endpoint in the first overlay tunnel fabric based on the mapping.

9. The method of claim 8, wherein a source of the multicast group is coupled to a third network device of the first overlay tunnel fabric;
   wherein the method further comprises:
      receiving a multicast data packet of the multicast group from the third network device; and
      preventing forwarding of the multicast data packet to the first tunnel based on the mapping in the first entry.

10. The method of claim 1, wherein the data structure maps a respective fabric identifier of an overlay tunnel fabric to a list of network addresses of tunnel endpoints in the overlay tunnel fabric.

11. A non-transitory computer-readable storage medium storing instructions that when executed by a processor of a gateway network device of a network cause the processor to perform a method, the method comprising:
   maintaining a first tunnel with a first network device in a first overlay tunnel fabric, and a second tunnel with a second network device in a second overlay tunnel fabric, wherein encapsulation of a packet sent via a respective overlay tunnel fabric is initiated and terminated within that overlay tunnel fabric, and wherein the gateway network device operates as a gateway for the first and second overlay tunnel fabrics;
   obtaining a first fabric identifier and a second fabric identifier from multicast control packets received via the first and second tunnels, respectively, wherein a respective fabric identifier uniquely identifies an overlay tunnel fabric;
   storing, a first entry in in a data structure of the gateway network device, a first Internet Protocol (IP) address of the first network device associated with the first fabric identifier;
   storing, in a second entry in the data structure, a second IP address of the second network device associated with the second fabric identifier; and
   determining whether to forward multicast control and data traffic, which is received by the gateway network device via a tunnel, to either one of the first and second overlay tunnel fabrics based on the first and second entries, respectively, in the data structure.

12. The non-transitory computer-readable storage medium of claim 11, wherein a respective fabric identifier of an overlay tunnel fabric is a hash value of a list of network addresses of tunnel endpoints of the overlay tunnel fabric.

13. The non-transitory computer-readable storage medium of claim 12, wherein the hash value is generated from a symmetric hash function, and wherein the list of network addresses is an unordered list.

14. The non-transitory computer-readable storage medium of claim 12, wherein the hash value is further generated based on an autonomous system (AS) number associated with the overlay tunnel fabric.

15. The non-transitory computer-readable storage medium of claim 11, wherein the multicast control packets comprising the first and second fabric identifiers are protocol-independent multicast (PIM) hello packets, wherein a respective fabric identifier is included in an option field of a corresponding PIM hello packet.

16. The non-transitory computer-readable storage medium of claim 11, wherein determining whether to forward the multicast control and data traffic further comprises:
receiving a Bootstrap message (BSM) from the first network device, wherein the BSM is associated with a Bootstrap Router (BSR) protocol;
determining that the first network device is in the first overlay tunnel fabric based on a mapping between the first fabric identifier and the first network address in the first entry in the data structure; and
preventing forwarding of the BSM message to a respective other tunnel endpoint in the first overlay tunnel fabric based on the mapping.

17. The non-transitory computer-readable storage medium of claim 11, wherein determining whether to forward the multicast control and data traffic further comprises:
receiving a multicast join request for a multicast group from the first network device;
determining that the first network device is in the first overlay tunnel fabric based on a mapping between the first fabric identifier and the first network address in the first entry in the data structure; and
preventing forwarding of the multicast join request to a respective other tunnel endpoint in the first overlay tunnel fabric based on the mapping.

18. The non-transitory computer-readable storage medium of claim 17, wherein a source of the multicast group is coupled to a third network device of the first overlay tunnel fabric;
wherein the method further comprises:
receiving a multicast data packet of the multicast group from the third network device; and
preventing forwarding of the multicast data packet to the first tunnel based on the mapping in the first entry.

19. The non-transitory computer-readable storage medium of claim 11, wherein the data structure maps a respective fabric identifier of an overlay tunnel fabric to a list of network addresses of tunnel endpoints in the overlay tunnel fabric.

20. A computer system, comprising:
a processor;
a storage device; and
a non-transitory computer-readable storage medium storing instructions that when executed by the processor cause the computer system to perform a method, the method comprising:
maintaining a first tunnel with a first network device in a first overlay tunnel fabric, and a second tunnel with a second network device in a second overlay tunnel fabric, wherein encapsulation of a packet sent via a respective overlay tunnel fabric is initiated and terminated within that overlay tunnel fabric, and wherein the computer system operates as a gateway for the first and second overlay tunnel fabrics;
obtaining a first fabric identifier and a second fabric identifier from multicast control packets received via the first and second tunnels, respectively, wherein a respective fabric identifier uniquely identifies an overlay tunnel fabric;
storing, in a first entry in a data structure stored in the storage device, a first Internet Protocol (IP) address of the first network device associated with the first fabric identifier;
storing, in a second entry in the data structure, a second IP address of the second network device associated with the second fabric identifier; and
determining whether to forward multicast control and data traffic, which is received by the computer system via a tunnel, to either one of the first and second overlay tunnel fabrics based on the first and second entries, respectively, in the data structure.

* * * * *